UNITED STATES PATENT OFFICE.

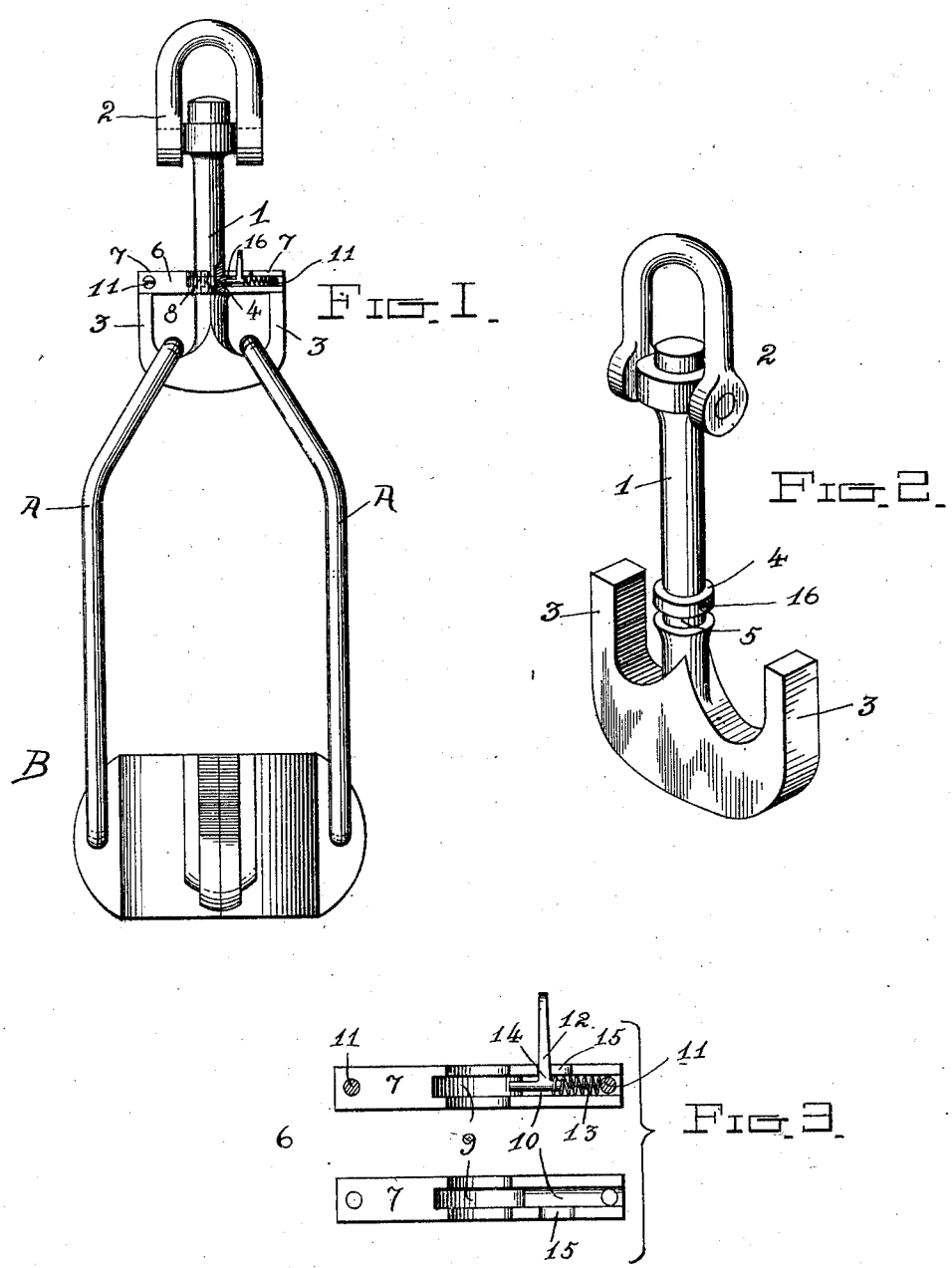

PATRICK J. TOWNSELL, OF PARKERSBURG, WEST VIRGINIA.

CASING AND TUBING HOOK.

972,416.  Specification of Letters Patent.  Patented Oct. 11, 1910.

Application filed April 30, 1910.  Serial No. 558,714.

*To all whom it may concern:*

Be it known that I, PATRICK J. TOWNSELL, a citizen of the United States, residing at Parkersburg, in the county of Wood and State of West Virginia, have invented certain new and useful Improvements in Casing and Tubing Hooks, of which the following is a specification.

My invention relates to hooks used in connection with putting in or pulling out casing, rods or tubing in drilled or drilling wells, and has for its object the provision of a double billed hook to receive the usual links on the elevator having a locking member mounted on the stem of the hook to close the bills when desired and a spring actuated bolt carried by said member to hold the locking member in a locked position.

My invention will be described in detail hereinafter and illustrated in the accompanying drawings in which—

Figure 1 is a view of my improved hook attached to an elevator and showing the locking member in a locked position, said locking member and the stem of the hook being partly in section, Fig. 2, a view of the hook with the locking member removed, and Fig. 3, a view showing the locking member dismembered.

In the drawings similar reference characters indicate corresponding parts in all of the views.

My improved hook has its stem 1 swivelly mounted in head 2 and is provided with two oppositely disposed hooks 3 to receive the links A of well casing or tubing elevator B. Stem 1 is formed with a peripherial shoulder 4 and an adjacent annular groove 5.

6 indicates a locking member consisting of two mating pieces 7 each formed with a semi-circular middle portion 8 grooved as shown at 9 to fit the shoulder 4 and groove 5 on the stem, and the corresponding ends of the pieces 7 are channeled as shown at 10 to form a bore in one arm of the member 6. The mating pieces 7 are held together on the stem 1 by means of screws 11 engaging the ends of the pieces.

12 indicates a locking bolt slidably mounted in the bore formed by grooves 9 and actuated normally into a locking position by means of coil spring 13 engaging the bolt and one of the screws 11.

14 indicates the operating stem of the locking bolt that extends through a slot 15 formed on the upper side of arm 10.

16 indicates a socket in the shoulder 4 to receive the locking bolt when the member 6 is in position to close the hooks 3, said bolt being held in engagement with the socket 16 by the action of spring 13 so that the member cannot swing from its locking position until the bolt is normally withdrawn from the socket. I have shown and described a single socket 16 but it is apparent that a socket may be provided opposite each hook bill so that when the locking member 6 is turned in either direction the bolt 12 will engage the socket to lock the member in position to prevent withdrawal of the elevator links.

Having thus described my invention, what I claim is:

1. In combination with a hoisting hook having a stem formed with a socket, a locking member removably mounted on the stem and adapted to close the hook, and means mounted on said locking member and engaging the socket aforesaid to hold the member in a locked position.

2. In combination with a hoisting hook having a stem, a peripheral shoulder on said stem and having a socket therein, a locking member engaging said shoulder and revolubly mounted on said stem, and means mounted on locking member and engaging the socket aforesaid to hold the member in a locked position.

3. In combination with a hoisting hook having a stem, a peripheral shoulder on said stem and having a socket therein, a locking member engaging said shoulder and revolubly mounted on the stem, and a spring actuated locking bolt mounted in said member and engaging the socket in the shoulder to hold the member from revolution.

4. In combination with a double-billed hoisting hook having a stem, a peripheral shoulder on said stem and having a socket therein, a locking member mounted on said stem and consisting of two mating pieces having semi-circular offsets in their middles with mating grooves to engage the shoulder on the stem, one arm of the locking member formed with a longitudinal bore and a slot communicating with said bore, a spring actuated locking bolt mounted in said bore and adapted to engage the socket in the shoulder to hold the locking member in a locking position, and a stem projecting from said bolt and extending through the slot in the locking member.

In testimony whereof I hereto affix my signature in the presence of two witnesses.

PATRICK J. TOWNSELL.

Witnesses:
JOSEPH HILE,
R. F. MURPHY.